United States Patent Office.

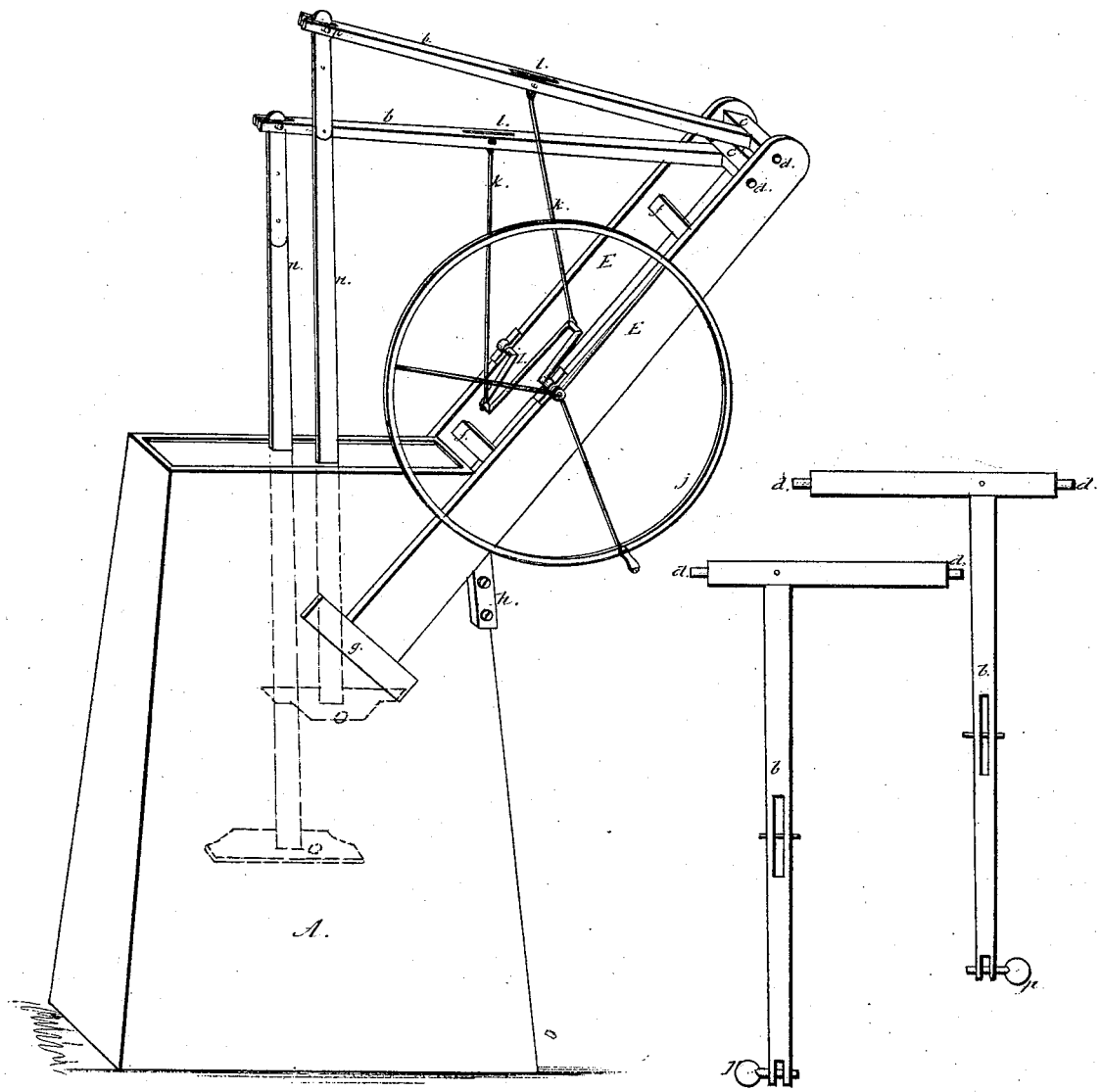

ALBION W. FOSTER, OF MILLBRIDGE, MAINE.

Letters Patent No. 101,453, dated April 5, 1870.

IMPROVEMENT IN CHURNS.

The Schedule referred to in these Letters Patent and making part of the same.

I, ALBION W. FOSTER, of Millbridge, in the county of Washington and State of Maine, have invented new and useful Improvements on a Churn, of which the following is a specification.

Nature and Objects of the Invention.

My invention relate to the combination of a frame and two levers attached to a round or square churn, in such a manner and at such an angle as to admit of a double crank and of two connecting-rods attached to the levers, which are also attached to the top ends of the dasher-rods. The balance-wheel attached to the crank being made to revolve causes the dashers to move up and down alternately in the churn, which is used to churn cream.

Description of the Accompanying Drawings.

Letter A is a square churn.

$b\ b$ are two levers of wood, tenoned into and near the opposite ends of two rollers of $c\ c$, whose round tenoned ends $d\ d$ are placed in holes at the top of the frame E E, which is also made of wood, having two side pieces E E held together by cross-bars or rounds, marked $f f$.

$g$ is a socket on each side of the churn A, in which rest the lower ends of the frame E E.

$h$ is two pieces of wood, on either side of the churn, at the corners, to support the frame E E at an angle of about forty-five degrees.

The double crank with balance-wheel attached, as shown at I and $j$, are hung or should be hung in metallic boxes on the top edge of the frame E E, and connected with the levers $b\ b$ by iron rods $k\ k$, which are attached to the levers $b\ b$ by slots and pins—iron pins, as shown at $l\ l$.

M is a wooden handle, by which the wheel I and crank $j$ are turned, which, being connected to the levers, as shown above, causes the dashers and dasher-rods $n\ n$ and $o\ o$ to move up and down alternately in the churn A, as and for the purpose set forth in the above specification.

Dasher-rods $n\ n$ are attached to the levers $b\ b$ by flat-headed pins $p\ p$.

Claim.

I claim as my invention—

The combination of the two levers $b\ b$ and frame E E and crank $j$, substantially as and for the purpose hereinbefore set forth.

ALBION W. FOSTER.

Witnesses:
EMERY SAWYER,
AUGUSTUS WALLACE.